United States Patent
Kanayama

(10) Patent No.: US 10,132,370 B2
(45) Date of Patent: Nov. 20, 2018

(54) NON-EXCITATION OPERATIVE BRAKE AND MOTOR WITH NON-EXCITATION OPERATIVE BRAKE

(71) Applicant: HARMONIC DRIVE SYSTEMS INC., Shinagawa-ku, Tokyo (JP)

(72) Inventor: Naoki Kanayama, Azumino (JP)

(73) Assignee: Harmonic Drive Systems Inc., Shinagawa-ku, Tokyo (JP)

( * ) Notice: Subject to any disclaimer, the term of this patent is extended or adjusted under 35 U.S.C. 154(b) by 34 days.

(21) Appl. No.: 15/321,776

(22) PCT Filed: Jun. 24, 2014

(86) PCT No.: PCT/JP2014/066729
§ 371 (c)(1),
(2) Date: Dec. 23, 2016

(87) PCT Pub. No.: WO2015/198399
PCT Pub. Date: Dec. 30, 2015

(65) Prior Publication Data
US 2017/0146079 A1    May 25, 2017

(51) Int. Cl.
*F16D 59/02* (2006.01)
*F16D 55/30* (2006.01)
(Continued)

(52) U.S. Cl.
CPC ............ *F16D 55/30* (2013.01); *F16D 59/02* (2013.01); *H02K 7/106* (2013.01);
(Continued)

(58) Field of Classification Search
CPC .. F16D 2121/20; F16D 2121/22; F16D 59/02; F16D 27/06; F16D 27/08;
(Continued)

(56) References Cited

U.S. PATENT DOCUMENTS 2,974,756 A * 3/1961 Roehm ................ H02K 7/1025
188/171
5,717,174 A * 2/1998 Ramos ................... B66B 1/32
187/288
(Continued)

FOREIGN PATENT DOCUMENTS

FR    2560722 A1 * 9/1985 ........... H02K 7/1028
GB    2 051 269 A    1/1981
(Continued)

OTHER PUBLICATIONS

International Search Report (PCT/ISA/210) dated Sep. 30, 2014, by the Japanese Patent Office as the International Searching Authority for International Application No. PCT/JP2014/066729 (5 pages).

*Primary Examiner* — Bradley T King
*Assistant Examiner* — Stephen M Bowes
(74) *Attorney, Agent, or Firm* — Buchanan Ingersoll & Rooney PC

(57) ABSTRACT

In a non-excitation operative brake, a friction plate faces the inner disk part of an attraction plate made from a magnetic material, and an electromagnet faces the outer disk part of the attraction plate. A part for generating a brake force acting on a hollow shaft is located on an inner circumferential side in a radial direction of the attraction plate, while a part for magnetically attracting the attraction plate so as to release the brake force is located on an outer circumferential side in the radial direction of the attraction plate. A flat non-excitation operative brake having a reduced length in the direction of an axis line can be realized.

4 Claims, 4 Drawing Sheets

(51) Int. Cl.
 *H02K 7/106* (2006.01)
 *F16D 65/02* (2006.01)
 *F16D 121/14* (2012.01)
 *F16D 121/22* (2012.01)
 *F16D 55/00* (2006.01)

(52) U.S. Cl.
 CPC ........... *F16D 2055/0058* (2013.01); *F16D 2065/1316* (2013.01); *F16D 2121/14* (2013.01); *F16D 2121/22* (2013.01)

(58) Field of Classification Search
 CPC ............ F16D 2055/0058; F16D 55/28; F16D 65/186; H02K 7/1025
 USPC .................................. 310/75 A, 93
 See application file for complete search history.

(56) References Cited

U.S. PATENT DOCUMENTS

| | | | |
|---|---|---|---|
| 5,989,151 A | | 11/1999 | Kershaw et al. |
| 6,129,184 A | * | 10/2000 | Ferrand ............ B60T 13/743 187/223 |
| 2009/0145703 A1 | * | 6/2009 | Elvenkemper ........ B29C 43/003 188/250 E |

FOREIGN PATENT DOCUMENTS

| | | | | |
|---|---|---|---|---|
| GB | 2164317 A | * | 3/1986 | ............ B25J 9/12 |
| JP | 52-133890 U | | 10/1977 | |
| JP | 2010-014153 A | | 1/2010 | |
| JP | 2013-002617 A | | 1/2013 | |

\* cited by examiner

NON-EXCITATION OPERATIVE BRAKE AND MOTOR WITH NON-EXCITATION OPERATIVE BRAKE

TECHNICAL FIELD

The present invention relates to a non-excitation operative brake, and to a motor with a non-excitation operative brake.

BACKGROUND ART

A non-excitation operative brake is installed in a servomotor or the like as a safety device for when the motor is not in operation. A non-excitation operative brake is provided with a friction plate, an attraction plate, and an electromagnet, which are located on an outer peripheral portion of a rotating shaft to be braked and which are aligned along an axial direction of the rotating shaft, as is disclosed in, e.g., Patent Document 1.

The attraction plate, which is capable of moving along the rotating shaft, is pushed by spring force against the friction plate, which is attached to the rotating shaft, whereby brake force is exerted on the rotating shaft. The attraction plate is made of a magnetic material, and when the electromagnet facing the attraction plate is excited, the attraction plate is moved by magnetic attraction force in a direction away from the friction plate against the spring force, and the brake force is released.

In a non-excitation operative brake 100, typically, a fixed plate 102 is disposed in a determined position along the direction of an axis 101a of a rotating shaft 101 in order to reliably generate brake force, as shown in FIG. 4. An attraction plate 104, which is capable of moving in the direction of the axis 101a, is urged toward the fixed plate 102 by spring force of a pressing spring 105 in a manner in which a friction plate 103 is sandwiched between the attraction plate and the fixed plate, the friction plate being attached so as to be capable of moving in the direction of the axis 101a relative to the rotating shaft 101. When an electromagnet 106 is excited, the attraction plate 104 is attracted, the friction plate 103 becomes free to rotate, and the brake force on the rotating shaft 101 is released.

PRIOR ART DOCUMENTS

Patent Documents

Patent Document 1: JP-A 2013-2617

SUMMARY OF THE INVENTION

Problems to be Solved by the Invention

Thus, this non-excitation operative brake is configured such that the friction plate and the electromagnet sandwich the attraction plate and face each other along the axial direction of the rotating shaft. When a fixed plate is provided, the fixed plate and the electromagnet sandwich the friction plate and the attraction plate and face each other along the axial direction of the rotating shaft. Therefore, installation space for aligning these three or four members in the axial direction is needed in the outer peripheral portion of the rotating shaft. For example, installation space of a width Wo in the axial direction is needed in the example shown in FIG. 4.

However, there are cases in which it is impossible or difficult to ensure installation space for disposing three or four members in alignment in the axial direction in the outer peripheral portion of the rotating shaft. There are also cases in which, in the outer peripheral portion of the rotating shaft, installation space is easily ensured nearer to the outer peripheral portion of the rotating shaft on one side in the axial direction of a friction plate attached to the rotating shaft, while installation space is easily ensured farther outward from the outer peripheral portion on the other side of the friction plate.

With the foregoing in view, it is an object of the present invention to provide a flat non-excitation operative brake in which the axial-direction installation space needed in the outer peripheral portion of the rotating shaft to be braked may be of small width.

Means of Solving the Problems

According to the present invention, there is provided a non-excitation operative brake in which an attraction plate made of a magnetic material is pressed by spring force against a friction plate that rotates integrally with a rotating shaft to be braked, brake force is exerted on the rotating shaft, and the attraction plate is moved by magnetic attraction force in a direction away from the friction plate against the spring force, releasing the brake force exerted on the rotating shaft, the non-excitation operative brake being characterized in that:

the attraction plate is provided with an inner-peripheral-side plate portion and an outer-peripheral-side plate portion enclosing the rotating shaft;

the inner-peripheral-side plate portion is one portion among a pressed portion pressed by the spring force against the friction plate and an attracted portion attracted by the magnetic attraction force; and the outer-peripheral-side plate portion is the other portion among the pressed portion and the attracted portion.

Specifically, the non-excitation operative brake of the present invention is characterized by including:

an attraction plate capable of magnetic attraction and supported so as to be able to move in an axial direction of a rotating shaft to be braked;

a friction plate that faces, from a first direction running along the axial direction, either one of an inner-peripheral-side portion and an outer-peripheral-side portion of the attraction plate in a radial direction of the rotating shaft, and that rotates integrally with the rotating shaft;

a pressing spring for urging the attraction plate along the axial direction and pressing the attraction plate against the friction plate; and an electromagnet that faces, from a second direction oriented in reverse to the first direction outer-running along the axial direction, the other of the inner-peripheral-side portion and the peripheral-side portion of the attraction plate, and that when excited, magnetically attracts the attraction plate in a direction away from the friction plate against the spring force of the pressing spring.

In the present invention, for example, the friction plate faces the inner-peripheral-side portion in the attraction plate along the axial direction, and the electromagnet faces the outer-peripheral-side portion in the attraction plate from the opposite side along the axial direction. Therefore, at a position near the outer peripheral surface of the rotating shaft, the attraction plate and the friction plate are aligned in the axial direction of the rotating shaft, and at a position farther outward from the outer peripheral surface, the attraction plate and the electromagnet are aligned in the axial direction of the rotating shaft.

Because two members are preferably aligned in the axial direction, a flat non-excitation operative brake having a reduced axial length can be achieved. In other words, in the outer peripheral portion of the rotating shaft, because the width of the installation space in which two members can be aligned in the axial direction is preferably ensured, the width of the installation space may be less than in the prior art, and the degree of freedom regarding the layout of the non-excitation operative brake is increased.

When the attraction plate is provided with an inner disk part which is the inner-peripheral-side portion extending in the radial direction, a cylindrical part extending radially outward from an outer peripheral edge of the inner-peripheral-side portion in a direction inclined at an angle of 90 degrees or less relative to the radial direction, and an outer disk part which is the outer-peripheral-side portion extending outward in the radial direction from a distal edge of the cylindrical part, it is preferable that the friction plate is disposed on the radially inner side of the cylindrical part, and the electromagnet is disposed on the radially outer side of the cylindrical part.

For example, within the axial-direction width dimension of the attraction plate, i.e., within the width dimension of the cylindrical part in the axial direction, the friction plate and the electromagnet are disposed on the inner side and outer side of the cylindrical part. It is thereby possible to achieve a flat non-excitation operative brake in which a small installation space in the axial direction is sufficient.

When the attraction plate is a disk extending in the radial direction, the friction plate can be made to face the inner-peripheral-side portion in the disk from the first direction, and the electromagnet can be made to face the outer-peripheral-side portion in the disk from the second direction.

If this is done, on the radially inner peripheral side of the attraction plate, installation space for aligning the attraction plate and the friction plate in the axial direction is preferably ensured on one side of the attraction plate. On the radially outer peripheral side of the attraction plate, installation space for aligning the attraction plate and the electromagnet in the axial direction is preferably ensured on the other side of the attraction plate. Therefore, the maximum axial width in the non-excitation operative brake can be reduced to a greater extent than in cases in which the friction plate, the attraction plate, and the electromagnet are aligned while overlapping in the axial direction. The degree of freedom in the layout of the non-excitation operative brake also increases.

The friction plate is preferably provided with a disk-shaped core made of a rigid member, and a disk-shaped friction material made of an elastic material attached to side surfaces of the core on both sides in the axial direction.

Next, when the attraction plate is a disk extending in the radial direction, in order to employ a layout in which the friction plate faces the radially outer peripheral side of the attraction plate, the friction plate is preferably provided with a support plate portion that supports the friction plate at a position where the friction plate faces the outer-peripheral-side portion of the attraction plate.

When the friction plate is provided with a disk-shaped core made of a rigid member, and a disk-shaped friction material made of an elastic material attached to side surfaces of the core on both sides in the axial direction, an inner-peripheral-side core member, which is a part of the core that protrudes radially inward from the friction material, is preferably used as the support plate portion.

Next, when the non-excitation operative brake has a fixed plate that faces the attraction plate from the axial direction with the friction plate therebetween, and that is non-rotatably disposed in a determined position in the axial direction, the attraction plate is urged by the spring force of the pressing spring toward the fixed plate while sandwiching the friction plate.

A motor of the present invention is characterized by having a non-excitation operative brake for applying brake force to a motor rotating shaft of the motor, the non-excitation operative brake being the non-excitation operative brake configured as described above.

MODE FOR CARRYING OUT THE INVENTION

Embodiments of a motor with a non-excitation operative brake, to which the present invention is applied, are described below with reference to the drawings. The non-excitation operative brake of the present invention can be similarly applied to rotating shafts other than the rotating shafts of motors.

Figure 1:
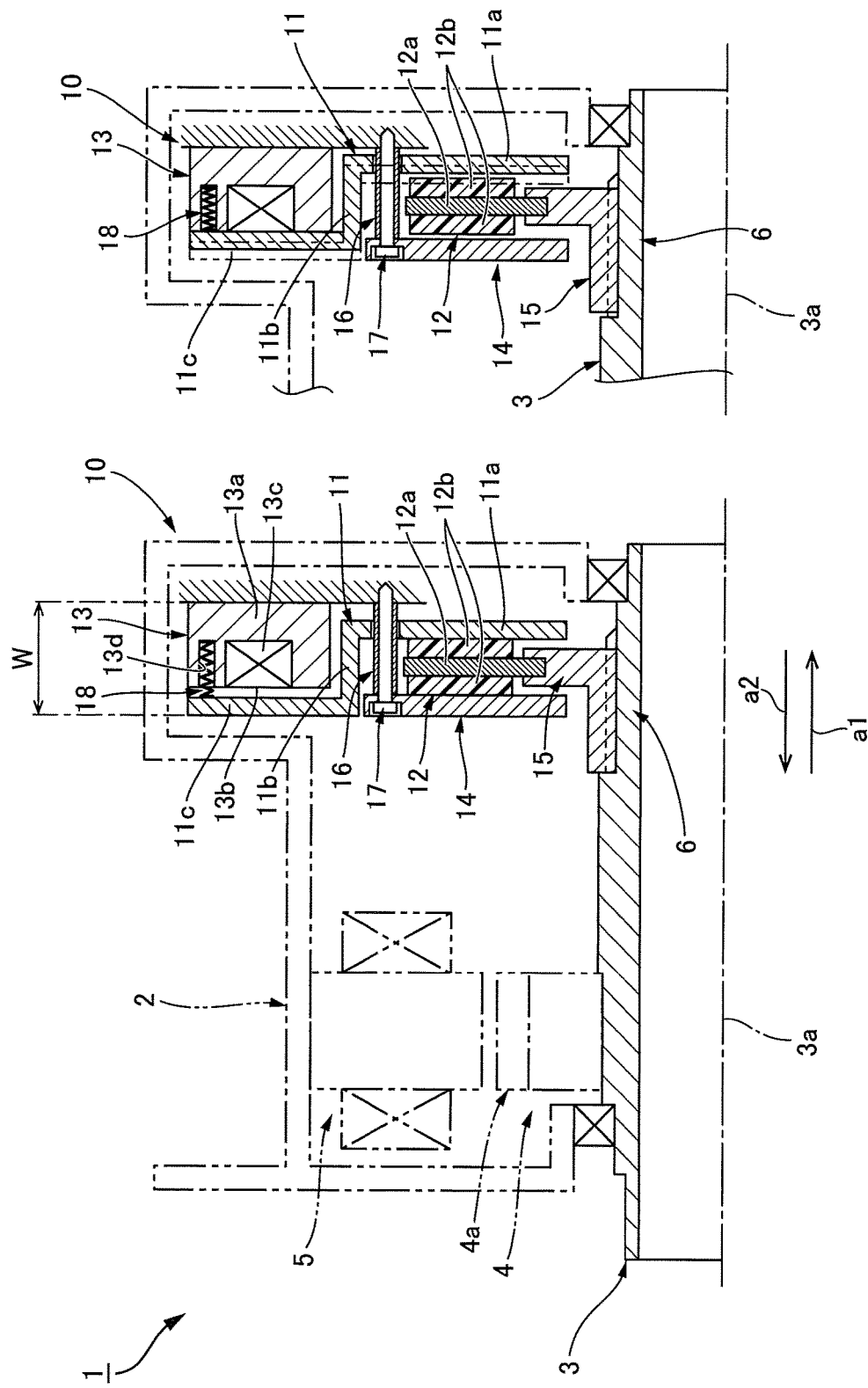
FIG. 1(a) and FIG. 1(b) are an explanatory diagram showing a motor equipped with a non-excitation operative brake according to an embodiment of the present invention.

FIG. 1(a) is an explanatory drawing showing a half section of a motor with a non-excitation operative brake according to an embodiment of the present invention, and FIG. (b) is an explanatory drawing showing a half section of the operating state of the non-excitation operative brake.

The motor 1 with a non-excitation operative brake is provided with, e.g., a hollow motor shaft 3 extending through a center part of a motor housing 2 shown with imaginary lines, the hollow motor shaft extending in the center axial direction of the motor housing. A motor rotor 4 provided with a cylindrical rotor magnet 4a is coaxially fixed to the hollow motor shaft 3. A motor stator 5 fixed to the motor housing 2 is disposed in a state of enclosing the rotor magnet 4a across a fixed gap.

A non-excitation operative brake 10, which functions as an emergency safety device, is installed on a shaft end part 6 on the rear side of the hollow motor shaft 3. The non-excitation operative brake 10 is provided with an attraction plate 11 made from a magnetic material, a friction plate 12 facing the attraction plate 11 from one side (a first direction a1) along an axis line 3a of the hollow motor shaft 3, an electromagnet 13 facing the attraction plate 11 from the other side (a second direction a2) of the axis line 3a, and a fixed plate 14 facing the attraction plate 11 from the first direction a1, with the friction plate 12 therebetween.

The attraction plate 11 has a cross-sectional shape provided with an inner disk part 11a (the inner-peripheral-side portion) extending in a direction orthogonal to the axis line 3a (the radial direction of the hollow motor shaft 3), a cylindrical part 11b having a constant diameter and extending in the second direction a2 from the outer peripheral edge of the inner disk part 11a, and an outer disk part 11c (the outer-peripheral-side portion) extending outward orthogonally with respect to the axis line 3a from the distal edge of the cylindrical part 11b in the second direction a2.

In the present example, the cylindrical part 11b having a constant diameter is formed between the inner disk part 11a and the outer disk part 11c. Instead, it is also possible to form a tapering tube part extending in a direction inclined less than 90 degrees relative to the radial direction of the hollow motor shaft 3. For example, a tubular part in the shape of a truncated cone inclined at an angle of 45 degrees relative to the radial direction of the hollow motor shaft 3 can be formed instead of the cylindrical part 11b.

The friction plate 12 is provided with an annular core 12a made from a rigid member extending in a direction orthogonal to the axis line 3a, and annular friction pads 12b having a high coefficient of friction and made from an elastic material affixed to the core side surfaces on both sides of the core 12a. The friction plate 12 faces the inner disk part 11a of the attraction plate 11 from the first direction a1, and is located on the radially inner side of the cylindrical part 11b of the attraction plate 11.

The inner peripheral edge part of the core 12a is fixed to a cylindrical boss 15. The boss 15 is attached by spline-joining, etc., to the shaft end part 6 of the hollow motor shaft 3 so as to be capable of sliding in the direction of the axis line 3a, and the boss rotates integrally with the hollow motor shaft 3. Therefore, the friction plate 12 is also capable of sliding in the direction of the axis line 3a, and also rotates integrally with the hollow motor shaft 3.

The electromagnet 13 is provided with an annular yoke 13a made of a magnetic material and having a rectangular cross section. One annular end surface 13b (the magnetic attraction surface) in the yoke 13a faces the outer disk part 11c in the attraction plate 11 from the second direction a2. An excitation coil 13c is housed within the yoke 13a, and the excitation coil 13c, which is exposed from the annular end surface 13b, faces the outer disk part 11c of the attraction plate 11. The electromagnet 13 is also disposed on the radially outer side of the cylindrical part 11b in the attraction plate 11.

The fixed plate 14 is a disk extending in a direction orthogonal to the axis line 3a, the fixed plate facing the friction plate 12 from the first direction a1 in the radially inner side of the cylindrical part 11b of the attraction plate 11. The fixed plate 14 is fixed by a fixing bolt 17 to the side near the yoke 13a of the electromagnet 13, with an annular spacer 16, which extends in the direction of the axis line 3a, being interposed therebetween.

The attraction plate 11 is supported by the annular spacer 16 so as to be capable of sliding in the direction of the axis line 3a. Spring-mounting holes 13d extending in the direction of the axis line 3a are formed in an outer-peripheral-edge region in the annular end surface 13b of the yoke 13a of the electromagnet 13. The spring-mounting holes 13d are formed at predetermined intervals in the circumferential direction, and pressing springs 18 are mounted in the spring-mounting holes 13d.

Each of the pressing springs 18 is a coil spring mounted in a compressed state between a bottom surface of a spring-mounting hole 13d and an outer-peripheral-edge portion of the outer disk part 11c of the attraction plate 11. The attraction plate 11 is urged in the second direction a2 by the pressing springs 18. The inner disk part 11a of the attraction plate 11 is thereby pressed toward the fixed plate 14, sandwiching the friction plate 12 therebetween. The friction plate 12 is sandwiched between the attraction plate 11 and the fixed plate 14 by the spring force of the pressing springs 18, whereby brake force is exerted on the hollow motor shaft 3 to which the friction plate 12 is attached. In this state, the electromagnet 13 reaches a state of non-excitation.

When a drive current is channeled to the electromagnet 13, causing excitation, the attraction plate 11 made from a magnetic material is attracted in the first direction a1 by the magnetic attraction force of the electromagnet 13. As a result, the attraction plate 11 slides in the first direction against the spring force of the pressing springs 18, and pushes against the annular end surface 13b of the electromagnet 13. The attraction plate 11 is thereby separated from the friction plate 12 in the first direction a1. FIG. 1(b) shows a state in which the electromagnet 13 has been excited and the attraction plate 11 has slid. In this state, the brake force on the hollow motor shaft 3 by the non-excitation operative brake 10 is released.

In the motor 1 with a non-excitation operative brake of the present example, the friction plate 12 and the fixed plate 14 of the non-excitation operative brake 10 are disposed in positions near the outer peripheral side of the hollow motor shaft 3, and the electromagnet is set apart from the outer periphery. In other words, the portion in the attraction plate 11 where friction force (brake force) is generated and the portion where magnetic attraction force is generated are divided in the radial direction, and do not overlap when viewed from a direction extending along the direction of the axis line 3a. Moreover, the portion in the attraction plate 11 where friction force is generated and the portion where magnetic attraction force is generated are misaligned in the direction of the axis line as well.

The width W of the non-excitation operative brake 10 in the direction of the axis line 3a is substantially equal to the value obtained by adding the sliding width of the attraction plate 11 to the width of the cylindrical part 11b of the attraction plate 11, as shown in FIG. 1(a) and FIG. 1(b). Consequently, the width in the direction of the axis line 3a can be made shorter than in cases in which the electromagnet 13, the attraction plate 11, the friction plate 12, and the fixed plate 14 are aligned in the outer periphery of the hollow motor shaft 3 while overlapping in the direction of the axis line 3a. Particularly, the non-excitation operative brake 10 of the present example is suitable for cases in which, in the outer peripheral portion of the hollow motor shaft 3, it is straightforward to ensure installation space in the radial direction, and difficult to ensure installation space in the direction of the axis line 3a.

Other Examples of Non-Excitation Operative Brake

Figure 2:
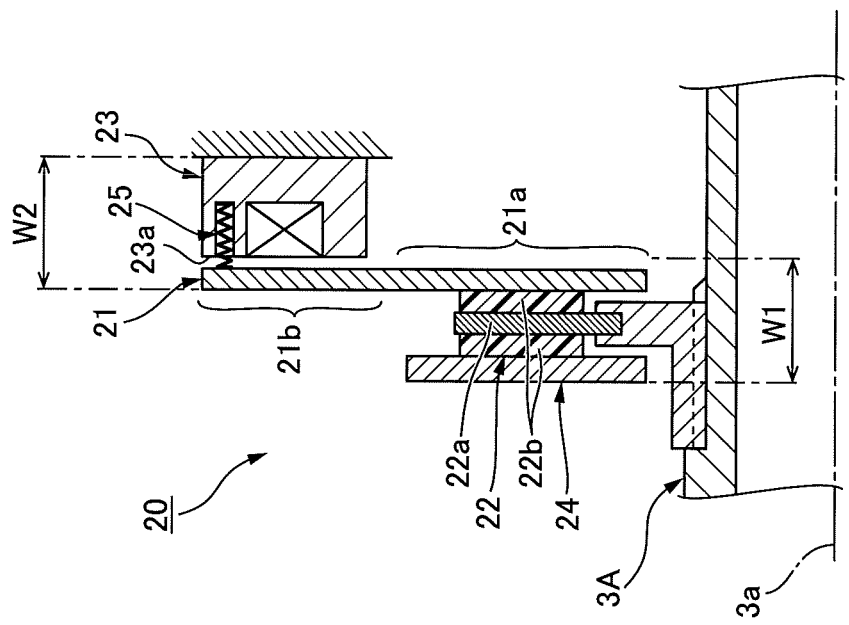
FIG. 2 is an explanatory diagram showing an embodiment of a non-excitation operative brake to which the present invention is applied.

FIG. 2 is an explanatory drawing showing another example of a non-excitation operative brake to which the present invention is applied. A non-excitation operative brake 20 is disposed on the outer peripheral portion of a rotating shaft 3A to be braked, and is provided with an attraction plate 21, a friction plate 22, an electromagnet 23, and a fixed plate 24.

The attraction plate 21 is a disc made from a magnetic material extending in a direction orthogonal to the axis line 3a of the rotating shaft 3A, and is supported on a fixed-side member (not shown) so as to be capable of sliding in the direction of the axis line 3a. The attraction plate 21 is provided with an inner-peripheral-side portion 21a for forming a frictional force generating part (brake force generating part), and an outer-peripheral-side portion 21b for forming a magnetic attraction force generating part.

The friction plate 22 faces the inner-peripheral-side portion 21a, which is on the radially inner side in the attraction plate 21, from one side along the axis line 3a. The friction plate 22 is supported by the rotating shaft 3A so as to be capable of sliding in the direction of the axis line 3a, the friction plate rotating integrally with the rotating shaft 3A. The friction plate 22 is configured from a disc-shaped core 22a made from a rigid material, and a disc-shaped friction pad 22b attached to the core side surfaces on both sides of the core.

The fixed plate 24 is disposed opposite the attraction plate 21 along the direction of the axis line 3a, with the friction plate 22 interposed therebetween. The fixed plate 24 is fixed to a fixed-side member (not shown), and disposed in a determined position in the direction of the axis line 3a. The fixed plate 24 is a disc-shaped member having an outside diameter dimension that encompasses the friction plate 22.

The annular electromagnet 23, which has a rectangular cross section, is disposed on the other side along the axis line 3a (the opposite side from the friction plate 22) of the outer-peripheral-side portion 21b on the radially outer side in the attraction plate 21. An annular magnetic attraction surface 23a of the electromagnet 23 faces the outer-peripheral-side portion 21b of the attraction plate 21. In the outer peripheral region of the magnetic attraction surface 23a, pressing springs 25 are disposed at predetermined angular intervals in the circumferential direction. The pressing springs 25 are mounted in a compressed state between the electromagnet 23 and the attraction plate 21.

In the non-excitation operative brake 20 thus configured, with the disc-shaped attraction plate 21 sandwiched in the middle, a friction force generating part is disposed in a portion on the radially inner peripheral side of the attraction plate, and a magnetic attraction force generating part is disposed in a portion on the radially outer peripheral side of the attraction plate. Therefore, the width W1 of the inner peripheral side in the radial direction is a dimension in which the inner-peripheral-side portion 21a of the attraction plate 21, the friction plate 22, and the fixed plate 24 can be installed, and the width W2 of the outer peripheral side in the radial direction is a dimension in which the outer-peripheral-side portion 21b of the attraction plate 21 and the electromagnet 23 can be installed.

These widths W1, W2 can be made shorter than in cases in which an electromagnet, an attraction plate, a friction plate, and a fixed plate are aligned on the outer periphery of the rotating shaft 3A, in the direction of the axis line 3a thereof. Consequently, the non-excitation operative brake 20 is suitable for cases such as when, in the outer peripheral portion of the rotating shaft 3A, it is straightforward to ensure installation space in the radial direction, and difficult to ensure installation space in the axial direction.

Other Additional Examples of Non-Excitation Operative Brake

Figure 3:
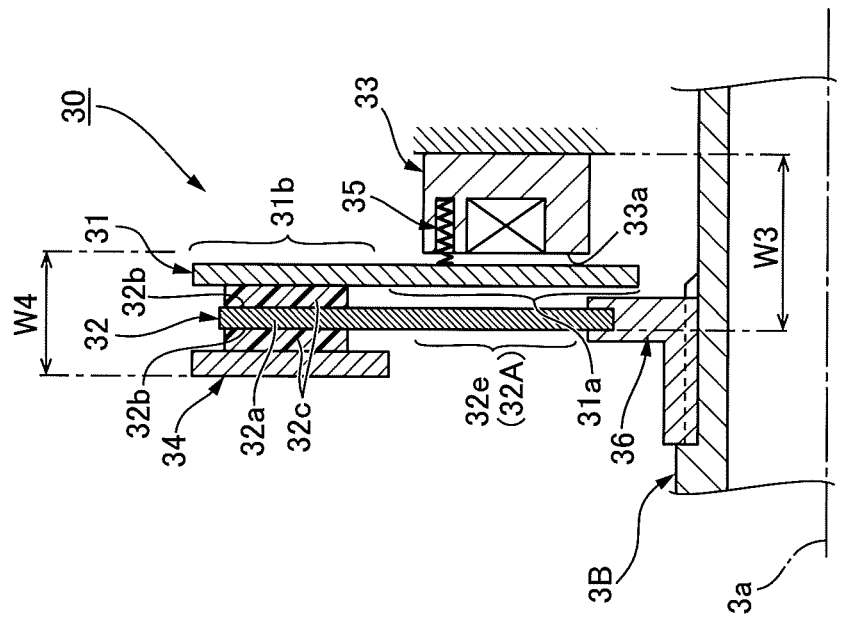
FIG. 3 is an explanatory diagram showing another embodiment of a non-excitation operative brake to which the present invention is applied.
Figure 4:
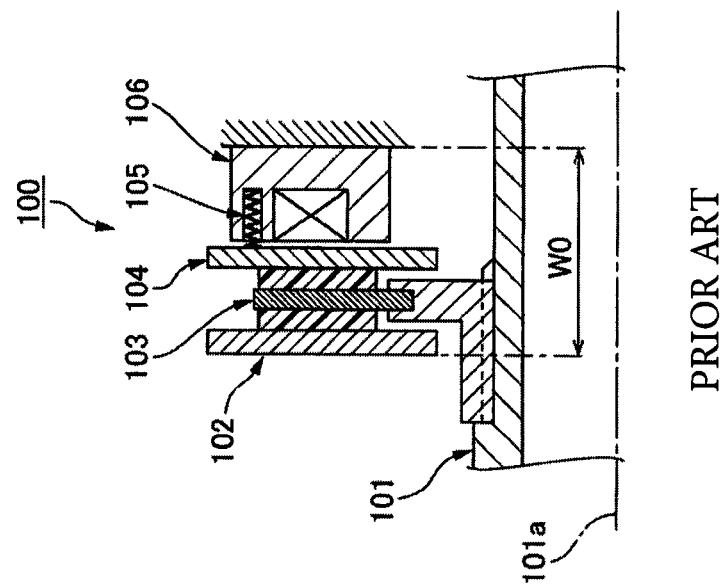
FIG. 4 is an explanatory diagram showing the layout of a common non-excitation operative brake.

FIG. 3 is an explanatory drawing showing yet another example of a non-excitation operative brake to which the present invention is applied. A non-excitation operative brake 30 is disposed on the outer peripheral portion of a rotating shaft 3B to be braked, and is provided with an attraction plate 31, a friction plate 32, an electromagnet 33, and a fixed plate 34.

The attraction plate 31 is a disc made from a magnetic material extending in a direction orthogonal to the axis line 3a of the rotating shaft 3B, and is supported on a fixed-side member (not shown) so as to be capable of sliding in the direction of the axis line 3a. The attraction plate 31 is provided with an outer-peripheral-side portion 31b for forming a friction force generating part (brake force generating part), and an inner-peripheral-side portion 31a for forming a magnetic attraction force generating part.

On the inner-peripheral-side portion 31a, which is on the radially inner side of the attraction plate 31, the annular electromagnet 33 having a rectangular cross section is disposed on one side along the axis line 3a. An annular magnetic attraction surface 33a of the electromagnet 33 faces the inner-peripheral-side portion 31a of the attraction plate 31. In the outer-peripheral-side region of the magnetic attraction surface 33a, pressing springs 35 are disposed at predetermined angular intervals in the circumferential direction. The pressing springs 35 are disposed in a compressed state between the electromagnet 33 and the attraction plate 31.

The friction plate 32 faces the outer-peripheral-side portion 31b, which is on the radially outer side in the attraction plate 31, from the opposite side of the electromagnet 33. Integrally formed with the friction plate 32 is a support plate portion 32A that supports the friction plate 32 at the position where the friction plate faces the outer-peripheral-side portion 31b of the attraction plate 31.

The friction plate 32 of the present example is configured from a disc-shaped core 32a made of a rigid material, and a disc-shaped friction material 32c made of an elastic member attached to core side surfaces 32b on both sides of the core 32a in the direction of the axis line 3a. The core 32a is a plate having substantially the same outside diameter dimension as the attraction plate 31, and the friction material 32c is disposed on the outer-peripheral-side core portion of the core 32a facing the outer-peripheral-side portion 31b of the attraction plate 31. An inner-peripheral-side core portion 32e, protruding radially inward from the friction material 32c in the core 32a, functions as the support plate portion 32A. The inner peripheral edge part of the support plate portion 32A is supported by an annular boss 36 attached so as to be capable of sliding in the direction of the axis line 3a, relative to the rotating shaft 3B.

In the non-excitation operative brake 30 thus configured, a friction force generating part is disposed in a portion on the outer peripheral side in the radial direction, and a magnetic attraction force generating part is disposed in a portion on the inner peripheral side in the radial direction, with the disc-shaped attraction plate 31 being sandwiched. The width W3 of the radially inner peripheral side is a dimension in which the inner-peripheral-side portion 31a of the attraction plate 31, the boss 36 of the friction plate 32, and the electromagnet 33 can be installed, and the width W4 of the outer peripheral side in the radial direction is a dimension in which the outer-peripheral-side portion 31b of the attraction plate 31, the friction plate 32, and the fixed plate 34 can be installed.

These widths W3, W4 can be made shorter than in cases in which an electromagnet, an attraction plate, a friction plate, and a fixed plate are aligned on the outer periphery of the rotating shaft 3B, in the direction of the axis line 3a thereof. Consequently, the non-excitation operative brake 30 is suitable for cases such as when, in the outer peripheral portion of the rotating shaft 3B, it is simple to ensure installation space in the radial direction, and difficult to ensure installation space in the axial direction.

In the non-excitation operative brake 30, the friction force generating part is positioned in a portion on the outer peripheral side of the attraction plate 31, which affords the additional advantage of enabling greater brake force to be exerted on the rotating shaft 3B.

The invention claimed is:

1. A non-excitation operative brake comprising:
an attraction plate configured to be magnetically attracted and supported for moving in an axial direction of a rotating shaft to be braked;
a friction plate that faces, from a first direction along the axial direction, an inner-peripheral-side portion of the attraction plate in a radial direction of the rotating shaft, and that rotates integrally with the rotating shaft;
a pressing spring for urging the attraction plate along the axial direction for pressing the attraction plate against the friction plate; and
an electromagnet that faces, from a second direction oriented in reverse to the first direction along the axial direction, an outer-peripheral-side portion of the attraction plate, and that when excited, magnetically attracts the attraction plate in a direction away from the friction plate against spring force of the pressing spring,
wherein the attraction plate has:
an inner disk part which is the inner-peripheral-side portion extending in the radial direction;
a cylindrical part extending from an outer peripheral edge of the inner-peripheral-side portion in a direction inclined at an angle of 90 degrees or less relative to the radial direction; and
an outer disk part which is the outer-peripheral-side portion extending outward in the radial direction from a distal edge of the cylindrical part,
wherein the friction plate is disposed on a radially inner side of the cylindrical part, and the electromagnet is disposed on a radially outer side of the cylindrical part; and
wherein the friction plate is disposed between axial ends of the cylindrical part, and the electromagnet is substantially disposed between the axial ends of the cylindrical part.

2. The non-excitation operative brake according to claim 1, wherein
the friction plate is provided with a disk-shaped core made of a rigid member, and a disk-shaped friction material made of an elastic material attached to both sides of the core in the axial direction.

3. The non-excitation operative brake according to claim 1, further comprising:
a fixed plate that faces the attraction plate from the axial direction in a state in which the friction plate is sandwiched between the fixed plate and the attraction plate, and that is nonrotatably disposed in a determined position in the axial direction,
wherein the attraction plate is urged by spring force of the pressing spring toward the fixed plate in a state of sandwiching the friction plate between the attraction plate and the fixed plate.

4. A motor comprising:
a motor rotating shaft; and
a non-excitation operative brake for applying brake force to the motor rotating shaft,
wherein the non-excitation operative brake comprises:
an attraction plate configured to be magnetically attracted and supported for moving in an axial direction of a rotating shaft to be braked;
a friction plate that faces, from a first direction along the axial direction, an inner-peripheral-side portion of the attraction plate in a radial direction of the rotating shaft, and that rotates integrally with the rotating shaft;
a pressing spring for urging the attraction plate along the axial direction and pressing the attraction plate against the friction plate; and
an electromagnet that faces, from a second direction oriented in reverse to the first direction along the axial direction, an outer-peripheral-side portion of the attraction plate, and that when excited, magnetically attracts the attraction plate in a direction away from the friction plate against spring force of the pressing spring,
wherein the attraction plate has:
an inner disk part which is the inner-peripheral-side portion extending in the radial direction;
a cylindrical part extending from an outer peripheral edge of the inner-peripheral-side portion in a direction inclined at an angle of 90 degrees or less relative to the radial direction; and
an outer disk part which is the outer-peripheral-side portion extending outward in the radial direction from a distal edge of the cylindrical part,
wherein the friction plate is disposed on a radially inner side of the cylindrical part, and the electromagnet is disposed on a radially outer side of the cylindrical part; and
wherein the friction plate is disposed between axial ends of the cylindrical part, and the electromagnet is substantially disposed between the axial ends of the cylindrical part.

* * * * *